(12) United States Patent
Passarelli et al.

(10) Patent No.: US 7,629,010 B2
(45) Date of Patent: Dec. 8, 2009

(54) PROCESS OF EXTRACTING CITRUS FIBER FROM CITRUS VESICLES

(75) Inventors: Jose Carlos F. Passarelli, Bebedouro (BR); Todd Matthiesen, Winter Haven, FL (US); Joost Vanhemelrijck, Meise (BE); Todd Gusek, Crystal, MN (US); David Reeder, Chanhassen, MN (US)

(73) Assignee: Cargill, Incorporated, Wayzata, MN (US)

( * ) Notice: Subject to any disclaimer, the term of this patent is extended or adjusted under 35 U.S.C. 154(b) by 281 days.

(21) Appl. No.: 11/178,589

(22) Filed: Jul. 12, 2005

(65) Prior Publication Data

US 2006/0115564 A1 Jun. 1, 2006

Related U.S. Application Data

(60) Provisional application No. 60/586,732, filed on Jul. 12, 2004.

(51) Int. Cl.
*A23L 1/212* (2006.01)

(52) U.S. Cl. ............... 426/425; 426/429; 426/506; 426/616; 426/640; 426/648

(58) Field of Classification Search ............... 426/616, 426/640, 648, 425, 429, 506
See application file for complete search history.

(56) References Cited

U.S. PATENT DOCUMENTS

| | | | |
|---|---|---|---|
| 2,372,561 A * | 3/1945 | Elgin | 162/53 |
| 4,236,445 A | 12/1980 | Sernagiotto et al. | |
| 4,297,215 A | 10/1981 | Altmeyer et al. | |
| 5,022,989 A | 6/1991 | Put | |
| 5,162,128 A * | 11/1992 | Mills et al. | 426/599 |
| 6,183,806 B1 | 2/2001 | Ficca et al. | |
| 7,166,315 B2 * | 1/2007 | Hartal et al. | 426/615 |

FOREIGN PATENT DOCUMENTS

| | | |
|---|---|---|
| DE | 19943188 A1 | 3/2001 |
| EP | 0179295 A1 | 4/1986 |
| EP | 0223703 A2 | 11/1986 |
| WO | 9733688 A1 | 9/1997 |

OTHER PUBLICATIONS

Database WPI, Section Ch, Week 199110, Derwent Publications Ltd., London, GB; AN 1991-071426 XP002364712 & SU 1 556681 A (Apr. 15, 1990) abstract.
Gibson, G.R., & Wiliams, C.M., "Functional Foods—Concept to Product," 2000, Chapter 13, pp. 315-326, CRC, USA, XP002364675.
Larrauri, Jose A. et al., "Water recycling in processing orange peel to a high dietery fibre powder," International Journal of Food Science & Technology, 1997, vol. 32, No. 1, pp. 73-76, XP002364674.
Porzio, M.A. and Blake, J.R., "Washed Orange Pulp: Characterization and Properties," 1983, pp. 191-204.

* cited by examiner

*Primary Examiner*—Helen F Pratt

(57) ABSTRACT

Citrus fiber is recovered from citrus vesicles to obtain a food additive for beverages, baked goods, meat or meat emulsions, confectionary, jams and jellies, dairy products, dressings, energy bars, and the like. Citrus vesicles optionally are washed with water, and water washed vesicles are recovered. The vesicles are contacted with an organic solvent to obtain organic solvent washed vesicles. The organic solvent washed vesicles are desolventized and dried citrus fiber is recovered.

15 Claims, 1 Drawing Sheet

PROCESS OF EXTRACTING CITRUS FIBER FROM CITRUS VESICLES

This application claims priority to U.S. Provisional Patent Application No. 60/586,732, entitled "Process of Extracting Citrus Fiber from Citrus Vesicles" and filed Jul. 12, 2004, the entirety of which is incorporated herein by reference.

1. FIELD OF THE INVENTION

The present invention is directed to citrus fiber extracted from citrus vesicles. The resulting dried citrus fiber is useful as a food additive for beverages, baked goods, meat or meat emulsions, confectionary, jams and jellies, dairy products, dressings, energy bars, and the like.

2. DESCRIPTION OF RELATED ART

Current processes for making citrus juice employ extractors for separating the juice-containing inner part of the fruit from its outer peel. The juice extracted by the extractors contains the juice itself as well as a pectinaceous and cellulosic material called citrus vesicles. This material sometimes is also referred to as coarse pulp, floaters, citrus cells, floating pulp, juice sacs, or pulp.

Citrus vesicles typically are separated from the juice by means of filtration, using equipment such as paddle finishers, screw finishers and turbo filters. The citrus vesicles contain a significant amount of juice-soluble solids. For economic reasons, the citrus vesicles often are subjected to a water washing step, e.g., using blenders, screw mixers, inline static mixers, finishers, or turbo filters. The water washing step produces a stream of secondary grade juice, referred to as water extracted soluble orange solids (WESOS) or simply "pulp wash." The washed cells, also called "washed pulp," are considered waste from this step. Typically, the washed cells are mixed with the peel (from the extraction process mentioned above), further processed (for example treated with lime to assist in dewatering) and dried for use as cattle feed.

Some efforts have been made to recover potentially valuable components from citrus waste. For example, U.S. Pat. No. 6,183,806 B1 to Ficca et al. describes citrus peel extracts and flour prepared from the extracts. Citrus peel is extracted with an ethanol solvent and the solid residue is desolventized to recover orange flour. The citrus peel is provided in comminuted pieces or particles. The comminuted pieces or particles may be provided in the form of washed pulp (pomace). Ficca uses the term "washed pulp" somewhat unconventionally to refer to pomace, a component of the peel. Ficca indicates that the orange flour extracted from pomace is similar in composition to the flour obtained from orange peel.

Washed citrus cells contain citrus fiber, a valuable citrus component which has relatively high total dietary fiber content and a balanced ratio of soluble to insoluble dietary fiber. The balanced dietary fiber spectrum of insoluble (chiefly cellulose) and soluble (chiefly pectin) fiber is advantageous in physiological functionality over cereal-based fibers. Citrus fiber, particularly orange pulp fiber, has an extremely high water binding capacity, resulting in high viscosities compared to other citrus fibers such as Vitacel orange fiber (available from Rettenmaier).

It would be desirable to develop a process for recovering citrus fiber from citrus vesicles, especially a process which can recover citrus fiber in an efficient and relatively cost effective manner. It would be especially desirable to develop a process which can recover citrus fiber without the need for using potentially hazardous agents. It would be particularly desirable to develop a process which provides citrus fiber that can be used as a food and beverage ingredient.

SUMMARY OF THE INVENTION

The present invention, according to one aspect, is directed to a process of purifying citrus fiber in citrus vesicles to obtain a food additive suitable for human consumption. The process comprises an optional step of washing citrus vesicles with water to remove unwanted flavors, odors, colors, sugars, acids and the like. The vesicles are contacted with an organic solvent to obtain organic solvent washed vesicles. The organic solvent washed vesicles are desolventized and dried citrus fiber is recovered therefrom.

In one preferred embodiment of the invention, the extraction process employs an ethanol solvent and a solids-to-solvent weight ratio of at least about 0.25:1, preferably at least about 0.5:1. The solvent extraction is carried out in at least two counter current stages. At least a portion of the solvent, preferably at least about 70%, is recovered and reused.

In another aspect of the present invention, dried citrus fiber is prepared by the extraction process as described above. The dried citrus fiber is useful as a food additive for such food products as beverages, baked goods, meat or meat emulsions, confectionary, jams and jellies, dairy products such as yogurt, dressings, energy bars, and the like.

In another aspect of the invention, a citrus fiber has a total dietary fiber content of from about 60 to about 85 wt % and a water binding capacity from about 9 to about 25 (w/w).

In one embodiment, dried citrus fiber has a total dietary fiber content of from about 60 to about 80 wt % and a water binding capacity from about 7 to about 12 (w/w). Preferably the total dietary fiber content is at least about 70 wt % and the water binding capacity is at least about 8 (w/w).

BRIEF DESCRIPTION OF THE DRAWINGS

The objects, features, and advantages of the invention will be apparent from the following more detailed description of certain embodiments of the invention and as illustrated in the accompanying drawings in which.

DETAILED DESCRIPTION OF THE INVENTION

Figure 1:
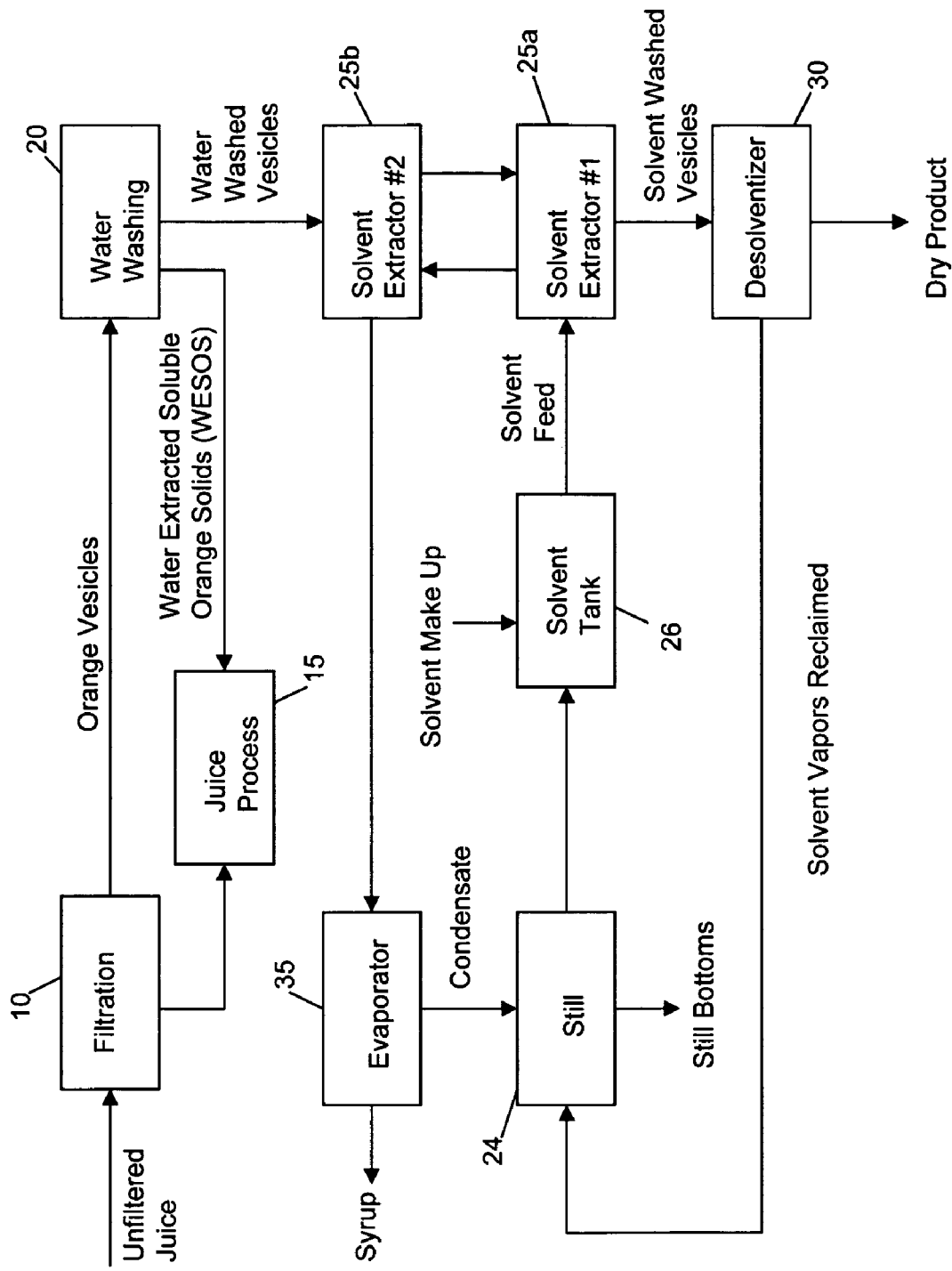
FIG. 1 is a schematic illustration of a two-stage counter-current solvent extraction process in accordance with a preferred embodiment of the present invention.

The present invention will be described primarily with reference to extracting orange fiber from orange vesicles. It should be understood that the process may be used for extracting citrus fiber from citrus vesicles from a wide variety of other types of citrus fruit, non-limiting examples of which include tangerines, limes, lemons, and grapefruit. The citrus vesicles typically have a water content of at least about 80 wt % and usually from about 90 to about 97 wt %.

The term "citrus vesicles," as used herein, refers to the pectinaceous and cellulosic material contained in the inner, juice-containing portion of citrus fruit. Citrus vesicles are sometimes also referred to as coarse pulp, floaters, citrus cells, floating pulp, juice sacs, or pulp.

The term "water extracted soluble solids," as used herein, refers to secondary grade juice which is obtained by water-washing citrus vesicles. The term "water extracted soluble solids" is particularly inclusive of water extracted soluble orange solids (WESOS). Water extracted soluble solids are sometimes also referred to as "pulp wash."

The term "water washed vesicles" refers to citrus vesicles from which water extracted soluble solids have been removed by washing with water. Water washed vesicles are also sometimes referred to as "washed cells" or "washed pulp."

The term "citrus fiber," as used herein, refers to a fibrous component obtained from water washed vesicles and isolated from waste components present therein. Citrus fiber is characterized by a high total dietary fiber content as well as a balanced ratio of soluble to insoluble dietary fiber. Citrus fiber, particularly orange fiber, has a very high water binding capacity.

Citrus fiber, as compared to citrus flour obtained from citrus peel, is lighter in color and relatively free of taste and odor. In contrast, citrus flour obtained from citrus peel is characterized by an orange peel taste, odor and color, which severely limit the product's uses. Additional advantages of citrus fiber include a higher total dietary fiber content (e.g., greater than about 70% versus 58%); lower carbohydrate content (e.g., about 5% versus 15%); and higher water binding capacity (e.g., greater than about 8 grams of water per gram of fiber versus 5.5 g/g). The protein content of the citrus fiber typically ranges from about 8 to 12 wt %.

The ratio of soluble to insoluble dietary fiber is an important factor in the citrus fiber's functionality. Preferably, the citrus fiber has a balanced ratio of soluble to insoluble dietary fiber. For example, the total dietary fiber preferably is made up of about 45-50% soluble dietary fiber and from 50-55% insoluble dietary fiber. Other important considerations include the degree of milling (granulometry) and drying conditions (process of drying). Generally, a higher degree of milling (i.e., a finer fiber granulometry) results in more smoothness of mouthfeel of the fiber in foods and beverages. Density and particle size may vary over a wide range depending on processing conditions. By way of example, density may range from about 80 to about 650 g/L, and average particle size may range from about 15 to about 600 microns. It should be understood that these ranges are merely exemplary. In some applications it may be desirable to employ significantly larger particle sizes, for example. In general, the citrus fiber may range from a very fine to a coarse powder structure.

As shown schematically in FIG. 1, orange vesicles can be separated from orange juice by filtration, e.g., using conventional filtration equipment 10 such as paddle finishers, screw finishers or turbo filters. The orange vesicles then can be subjected to an optional water washing step using suitable equipment 20 such as blenders, inline static mixers, finishers, or turbo filters. Water washing is desirable to eliminate undesirable flavors, odors, and acids present in the citrus vesicles. The water washing step 20 produces a stream of water extracted soluble orange solids (WESOS). The water extracted soluble orange solids, together with the juice obtained by filtration 10, can be further processed using conventional juicing equipment 15.

An organic solvent is used to extract flavors, odors, colors and the like from the water washed vesicles. The solvent should be polar and water-miscible to facilitate removal of the desired components. Preferred solvents include lower alcohols such as methanol, ethanol, propanol, isopropanol, or butanol. The solvent may be (and preferably is) provided in aqueous solution. The concentration of solvent in the solvent solution most often ranges from about 70 wt % to about 100 wt %. In one embodiment, a 75 wt % aqueous ethanol solution is used as solvent. In a preferred embodiment, a 90 wt % aqueous ethanol solution is used as solvent. In general, solvents will remove water-soluble components at lower concentrations and oil-soluble components at higher concentrations. Optionally, a more non-polar co-solvent may be added to the aqueous alcohol to improve the recovery of oil-soluble components in the citrus vesicles. Examples of such non-polar solvents include ethyl acetate, methyl ethyl ketone, acetone, hexane, methyl isobutyl ketone and toluene. The more non-polar solvents may be added at up to 20% of the solvent mixture. Many solvents, such as ethanol, have a lower heat of vaporization than that of water, and therefore require less energy to volatilize than would be needed to volatilize an equivalent mass of water. The solvent preferably is removed and reclaimed for reuse.

Preferably, the water washed vesicles are contacted with organic solvent at a solids-to-solvent weight ratio of at least about 0.25:1, preferably at least about 0.5:1, and often at least about 0.75:1, from about 1:1 to about 5:1, or from about 1.5:1 to about 3:1, based on the wet weight of the solids. In one embodiment, the solids-to-solvent ration is about 2:1.

Extraction can be accomplished using a single stage but preferably is performed using multi-stage extraction, e.g., a two-, three-, or four-staged extraction process, and preferably using countercurrent extraction. There is no particular upper limit contemplated on the number of extraction stages that may be used. FIG. 1 schematically illustrates a preferred embodiment in which a two-stage countercurrent extraction process employs first and second solvent extractors 25a and 25b, respectively.

Water washed vesicles are fed into the second extractor 25b. An aqueous ethanol solvent is fed from a solvent tank 26 into the first solvent extractor 25a. Spent solvent from the first solvent extractor 25a is fed into the second solvent extractor 25b, while the extracted citrus vesicles from the second solvent extractor 25b are fed into the first solvent extractor 25a. Spent solvent from the second solvent extractor 25b may be fed into an evaporator 35 (optional) to separate solids (e.g., sugars, colors, flavors, citrus oils, etc.) from the spent solvent, which can be condensed and returned to a still 24. Still bottoms (predominately water) are separated and removed.

After each extraction stage, a belt filter press (not shown) preferably is used to further remove liquids. A belt filter press may be of conventional construction which is known to persons skilled in the art. Details of suitable belt filter presses are found, for example, in U.S. Pat. Nos. 4,236,445, 4,297,215, and 5,022,989, the disclosures of which are hereby incorporated by reference.

Solvent washed vesicles from the first solvent extractor 25a are fed to a desolventizer 30. The desolventizer 30 removes solvent and water from the solids remaining after extraction, enabling the solvent to be reclaimed for future use and also ensuring that the product is safe for milling and commercial use. The desolventizer 30 can employ indirect heat to remove significant amounts of solvent from the solid residue. Alternatively, direct heat can be provided for drying, e.g., by providing hot air from flash dryers or fluidized bed dryers. Direct steam may be employed, if desired, to remove any trace amounts of solvent remaining in the solids. Vapors from the desolventizer 30 preferably are recovered and fed to the still 24 to reclaim at least a portion of the solvent.

Retention time in each extraction step may vary over a wide range but usually is about 5 minutes or less and preferably is about 3 minutes or less. The temperature in the solvent extractor(s) depends on such factors as the type of solvent used but most often ranges from about 40° F. to about 180° F. at atmospheric pressure.

Temperatures can be appropriately increased or decreased for operation under super- or sub-atmospheric pressures. Optionally, techniques such as ultra-sound are used for enhancing efficiency of the extraction process. By maintaining a closed system, solvent losses during extraction, desolventizing, and distillation can be minimized. Preferably, at least about 70 wt % of the solvent is recovered and reused. A solvent make-up stream delivers fresh solvent into the solvent tank 26 to replenish any solvent that is not recovered.

The dried orange fiber product is generally a coarse material. The material can be milled if a flour or finer powder is needed for a particular application. Optionally, the citrus fiber is subjected to one or more additional treatments needed or desired for a particular end use. For example, natural enzymes may be inactivated prior to the solvent extraction process or drying. Enzymes may be inactivated, e.g., by ultrasound or by conventional thermal inactivation.

Unlike many typical commercial fibers, the orange citrus fiber of the present invention has thickening power, creates pulpy textures (coarse fraction) and has good stability. For example, the citrus fiber can be used for 1% sucrose replacement in a standard bakery cream recipe with improved baking stability and good freeze/thaw stability. This indicates an extremely high water binding capacity of the citrus fiber, resulting in relatively high viscosities.

The high water binding capacity can be beneficial for many applications (e.g., processed meat applications). In other applications, such as in bakery products, a high water binding capacity may not be desirable. Extremely fine milled fibers (e.g., 20 to 30 μm particle size) generally will show superior sensory characteristics (high smoothness).

In addition to having utility as a food additive in beverages, baked goods, meat or meat emulsions (e.g., sausage, bologna, hot dogs), confectionary, jams and jellies, dairy products, dressings, energy bars, and the like, the citrus fiber also potentially can be used as a thickening agent or texturizer for food products, such as yogurt, or as a carrier for other components in beverage systems. Suitable amounts of citrus fiber for the various food products can be determined by persons skilled in the art in accordance with such factors as user preferences and with the aid of no more than routine experimentation.

EXAMPLE 1

This example illustrates extracting citrus fiber from water washed orange vesicles using a 75 wt% aqueous ethanol solvent solution in a two stage countercurrent extraction process as described above. The resulting citrus fiber was analyzed for dietary fiber content using AOAC method 991.43 (Prosky). The citrus fiber was found to have the composition and properties set forth in Table 1:

TABLE 1

| | |
|---|---|
| Total Dietary Fiber (TDF) | 72.3% |
| Soluble Dietary Fiber (SDF) | 37.1% |
| Insoluble Dietary Fiber (IDF) | 34.4% |
| Carbohydrates | 5% |
| Proteins (dry basis) | 1.6% N (9.7% protein) |
| Fatty Acids (dry basis) | 0.16% |
| Ash | 2.14% |
| Sodium | 102 mg/kg |
| Potassium | 4960 mg/kg |
| Magnesium | 648 mg/kg |
| Calcium | 1850 mg/kg |
| Phytic Acid | 479 ppm |
| Moisture | 11% |

EXAMPLE 2

This example illustrates preparing bread containing citrus fiber. Table 2 lists the ingredients used to prepare the bread:

TABLE 2

| Ingredient | Amount (g) |
|---|---|
| Duo Flour (Ceres) | 950 |
| Citrus fiber | 30 |
| Bread improver | 100 |
| Salt | 17 |
| Margarine | 20 |
| Water | 551 |

All dry ingredients were blended in a spiral mixer (Veema type). Water was then added, and the resulting dough was mixed for 20 minutes. The dough was divided into 700 gram portions. Sheeting and proofing were carried out for 1.5 hours at 32° C. and 82% relative humidity. The bread was baked in a floor oven at 220° C. for 35 minutes.

EXAMPLE 3

This example illustrates preparing a dressing (30% oil type) containing citrus fiber. Table 3 lists the ingredients used to prepare the dressing:

TABLE 3

| Ingredient | Amount (wt %) |
|---|---|
| Sugar | 3 |
| Salt | 2 |
| Potassium sorbate | 0.12 |
| Water | 49.8 |
| Oil | 12 |
| Citrus fiber | 3 |
| Egg yolk powder | 1.5 |
| Xanthan + guar gum | 0.2 |
| Sunflower oil | 18 |
| Vinegar | 7.2 |
| Mustard | 3 |

The water and acid phase were added into a Fryma colloid mill. The dispersion phase was then added and homogenized for 30 seconds. The oil phase was added over the next one minute, and the mixture was emulsified for an additional 30 seconds. The dressing was then filled into jars.

EXAMPLE 4

This example illustrates preparing a beef burger containing citrus fiber. Table 4 lists the ingredients used to prepare the beef burger:

TABLE 4

| Ingredient | Amount (wt %) |
|---|---|
| Beef (grinded) | 90 |
| Spices | 1.5 |
| Citrus fiber | 1.5 |
| Water | 7 |

All ingredients (except spices) were blended in a Hobart Mixer Type N50CE at speed 1. The spices were added after 30 seconds. The mixture was blended up to 5 minutes, with the mass turn manually after 2.5 minutes. The mass was cooled in a refrigerator for 2 hours. The burgers were formed as 90 g servings with an 80 mm diameter. The burgers can be cooked in frying pan until a core temperature of 74-75° C. is obtained.

EXAMPLE 5

This example illustrates preparing a jam containing citrus fiber. Table 5 lists the ingredients that can be used to prepare the jam:

TABLE 5

| Ingredient | Amount (wt %) |
|---|---|
| Mixed Berries (red fruits, frozen) or strawberries | 43 |
| Sucrose | 25 |
| Fructose syrup | 25 |
| Citrus fiber | 2 |
| Water | 5 |
| Citric acid solution (50%) | to bring pH to 3.4 |

The fruit, sweeteners and water can be blended and cooked together. The citrus fiber then can be added and boiled to the desired dry substance. The citric acid solution then can be added until the mixture reaches a pH of 3.4. The jam can be hot-filled into glass jars.

EXAMPLE 6

This example illustrates preparing energy bars. Table 6 lists the ingredients used to prepare the energy bars:

TABLE 6

| Ingredient | Amount (wt %) |
|---|---|
| Fructose syrup | 14 |
| Sucrose | 8 |
| Isomaltulose (Cerestar Cargill) | 15 |
| Water | 3 |
| Glycerol | 3 |
| Palm fat | 7 |
| Citrus fiber | 3 |
| Red fruity nuggets | 15 |
| Lecithin | 1 |
| Oats flakes | 13 |
| Soy nuggets | 11 |
| Whey powder | 7 |

The sweeteners and water were heated in a pan to 88° C. The molten fat and lecithin were blended in a Hobart mixer for 1 minute at speed 1. The sweetener was added to the fat and blended at speed 1 for 1 minute. The dry ingredients were added and mixed at speed 1 for 30 seconds. The mixture was deposited onto a sheet and cut to the desired size. The bars were then cooled and packaged.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A process of recovering citrus fiber from citrus vesicles to obtain a food additive suitable for human consumption, the process comprising:
   (i) washing citrus vesicles with water and recovering water washed vesicles therefrom;
   (ii) contacting the water washed vesicles with an organic solvent to obtain organic solvent washed vesicles, wherein the water washed vesicles are contacted in this step with an organic solvent for 5 minutes or less; and
   (iii) desolventizing the organic solvent washed vesicles and recovering dried citrus fiber therefrom; wherein the dried citrus fiber has a total dietary fiber content of from about 60 to about 85 wt% and a water binding capacity of from about 9 to about 25 (w/w).

2. The process of claim 1 wherein the organic solvent is an alcohol.

3. The process of claim 2 wherein the organic solvent is ethanol.

4. The process of claim 1 wherein the citrus vesicles are obtained from citrus fruit selected from the group consisting of oranges, tangerines, limes, lemons, and grapefruit.

5. The process of claim 1 wherein the water washed vesicles are contacted with organic solvent at a solids-to-solvent weight ratio of at least about 0.25:1.

6. The process of claim 1 wherein the organic solvent extraction is carried out in at least two countercurrent stages, wherein each countercurrent stage has a duration of 5 minutes or less.

7. The process of claim 1 wherein the organic solvent extraction is carried out in a continuous process.

8. The process of claim 1 wherein the organic solvent is water-miscible.

9. The process of claim 1 wherein the organic solvent has a concentration of at least about 70 wt%.

10. The process of claim 1 further comprising pressing the organic solvent extract on a filter press to remove liquid.

11. The process of claim 1 wherein at least a portion of the organic solvent is re-cycled and recovered.

12. The process of claim 11 wherein at least about 70 wt% of the organic solvent is recovered.

13. A process of recovering citrus fiber from citrus vesicles to obtain a food additive suitable for human consumption, the process comprising:
   (i) providing citrus vesicles from citrus fruit selected from the group consisting of oranges, tangerines, limes, lemons, and grapefruit, wherein the citrus vesicles have a water content of at least about 80 wt %.
   (ii) washing the citrus vesicles with water and recovering water washed vesicles therefrom;
   (iii) contacting the water washed vesicles with an ethanol solvent at a solids-to-solvent weight ratio of at least about 0.25:1 to obtain solvent washed vesicles, wherein the solvent extraction is carried out in at least two countercurrent stages and the duration of each countercurrent stage is 5 minutes or less;
   (iv) desolventizing the solvent washed vesicles and recovering dried citrus fiber therefrom, wherein the dried citrus fiber has a total dietary fiber content of from about 60 to about 85 wt% and a water binding capacity of from about 9 to about 25 (w/w); and
   (v) recovering and recycling at least a portion of the ethanol solvent.

14. The process of claim 13 wherein the solvent retention time in each countercurrent stage is 3 minutes or less.

15. The process of claim 1 wherein the water washed vesicles are contacted with an organic solvent for 3 minutes or less.

* * * * *

UNITED STATES PATENT AND TRADEMARK OFFICE
CERTIFICATE OF CORRECTION

PATENT NO. : 7,629,010 B2 Page 1 of 1
APPLICATION NO. : 11/178589
DATED : December 8, 2009
INVENTOR(S) : Jose Carlos F. Passarelli et al.

It is certified that error appears in the above-identified patent and that said Letters Patent is hereby corrected as shown below:

In column 4, line 17, delete "ration" and insert -- ratio --, therefor.

In column 8, line 42, in Claim 13, delete "wt%." and insert -- wt%; --, therefor.

Signed and Sealed this

Thirtieth Day of March, 2010

David J. Kappos
*Director of the United States Patent and Trademark Office*